United States Patent [19]

Bollinger et al.

[11] Patent Number: 4,891,489
[45] Date of Patent: Jan. 2, 1990

[54] SHIELD CUP PROTECTOR APPARATUS FOR PLASMA ARC TORCH

[75] Inventors: Lawrence A. Bollinger, Gibsonia; Mark A. Tarhay, Arnold, both of Pa.

[73] Assignee: Allegheny Ludlum Corporation, Pittsburgh, Pa.

[21] Appl. No.: 266,747

[22] Filed: Nov. 3, 1988

[51] Int. Cl.⁴ ................................. B23K 9/00
[52] U.S. Cl. ..................... 219/121.48; 219/121.5; 219/121.39; 219/137.43
[58] Field of Search ............ 219/74, 75, 121.48, 219/121.39, 121.5, 121.52, 121.51, 137.43, 137.31, 137.41; 313/231.31–231.51

[56] References Cited

U.S. PATENT DOCUMENTS

| 3,204,076 | 8/1965 | Browning | 219/121.5 |
| 3,469,069 | 9/1969 | Allen | 219/75 |
| 3,649,805 | 3/1972 | Rohrberg | 219/121.5 |
| 3,798,409 | 3/1974 | Troye et al. | 219/75 |
| 3,832,513 | 8/1974 | Klasson | 219/121.5 |
| 4,087,670 | 5/1978 | Miller | 219/121.5 |
| 4,590,354 | 5/1986 | Marhic et al. | 219/121.5 |
| 4,672,163 | 6/1987 | Matsui et al. | 219/137.43 |
| 4,778,155 | 10/1988 | Suchevich et al. | 219/121.39 |

FOREIGN PATENT DOCUMENTS 0068267  4/1982  Japan ................. 219/121.5

Primary Examiner—M. H. Paschall
Attorney, Agent, or Firm—Patrick J. Viccaro

[57] ABSTRACT

A shield cup protector apparatus for protecting a ceramic shield cup of a plasma arc torch from breakage during operation thereof. The shield cup protector apparatus is comprised of an elongated cylinder having first and second open ends. A first open end of the elongated cylinder is positioned to abut a peripheral portion of the shield cup, allowing the shield cup to extend into an inner cavity formed by the cylinder, thereby allowing the shield cup to support the cylinder therefrom, while also allowing the elongated cylinder to surround the exposed surfaces of the shield cup to protect the shield cup thereby.

4 Claims, 2 Drawing Sheets

SHIELD CUP PROTECTOR APPARATUS FOR PLASMA ARC TORCH

BACKGROUND OF THE INVENTION

1. Field of the Invention

The present invention relates generally to cutting apparatus, and, more particularly, to a shield cup protector apparatus for protecting the shield cup of a plasma arc torch.

2. Description of the Prior Art.

Plasma arc torches are utilized with great frequency for the performance of various metal cutting and welding operations. The plasma arc torch generates a high-temperature discharge which allows fast and uniform cutting and/or welding of the metal.

In some instances, the torch is portable and may be hand-held. In other instances, the torch comprises a portion of a machine. In each design, though, the torch is comprised of a torch body which supports an electrode, from which the plasma arc discharge occurs. Electrical power and an ionizable gas are supplied to the torch body, where the gas is ionized, thereby causing the plasma arc across the electrode. In most instances, a ceramic shield cup surrounds torch tip to provide a passage way for the secondary or shield gas.

The shield cup of a plasma arc torch is comprised of a ceramic material because of the heat-resistant quality thereof. However, brittleness is also a quality of ceramic materials.

During operation of the plasma arc torch in various metalworking applications, a constant distance, the stand-off distance, must be maintained between the torch tip (i.e., the torch electrode) and the metal workpiece. This constant separation distance is difficult to maintain, and, in some instances, the torch operator is unable to maintain the separation distance, and allows the ceramic shield cup to contact the workpiece. Because of the brittleness of the ceramic shield cup, the impact of the workpiece may cause the shield cup to break. Such breakage of the shield cup necessitates replacing the shield cup prior to further use of the plasma arc torch.

Several devices are available to alleviate this problem. One such device is sold by Thermal Dynamics Corp. and comprises a carriage with two wheels attached to the torch by a clamp. This device primarily maintains a stand-off distance, and offers little protection to the shield cup for preventing its breakage. Thermal Dynamics also markets a "Crown Shield Cup" which similarly maintains a stand-off distance, but is comprised of a ceramic material susceptible to breakage.

It is therefore the object of the present invention to provide an apparatus to prevent damage to the ceramic shield cup of the plasma arc cutting torch.

It is a further object of the present invention to provide a shield cup protector apparatus which maintains a proper stand-off distance between the torch tip and the workpiece while allowing exhaust of slag and gases from the work site.

SUMMARY OF THE INVENTION

In accordance with the present invention, a shield cup protector apparatus is provided for protecting a ceramic shield cup of a plasma arc torch. The protector apparatus is comprised of an elongated cylinder having first and second open ends, such that the first open end of the elongated cylinder being dimensionally compatible with the shield cup to be slidable over the shield cup in order to seat firmly about peripheral portion of the shield cup and a the shield cup to extend into an inner cylindrical cavity formed by the cylinder for support thereof. The elongated cylinder having a length projecting to the second end to extend beyond and surround exposed surfaces of the shield cup, protecting the shield cup thereby.

Preferably, the circumferential end portion of the first end of the elongated cylinder is chamfered to fit against the outer periphery of the shield cup to allow firm seating against the plasma arc torch body. The length of the elongated cylinder is preferably of a length to allow a proper stand-off distance for torch operation when the second open end of the elongated cylinder is positioned to abut against a workpiece. In one embodiment of the present invention, the elongated cylinder is comprised of a glass cloth silicone resin compound.

BRIEF DESCRIPTION OF THE DRAWINGS

The present invention will be better understood when read in light of the accompanying drawings in which.

DESCRIPTION OF THE PREFERRED EMBODIMENT

Figure 1:
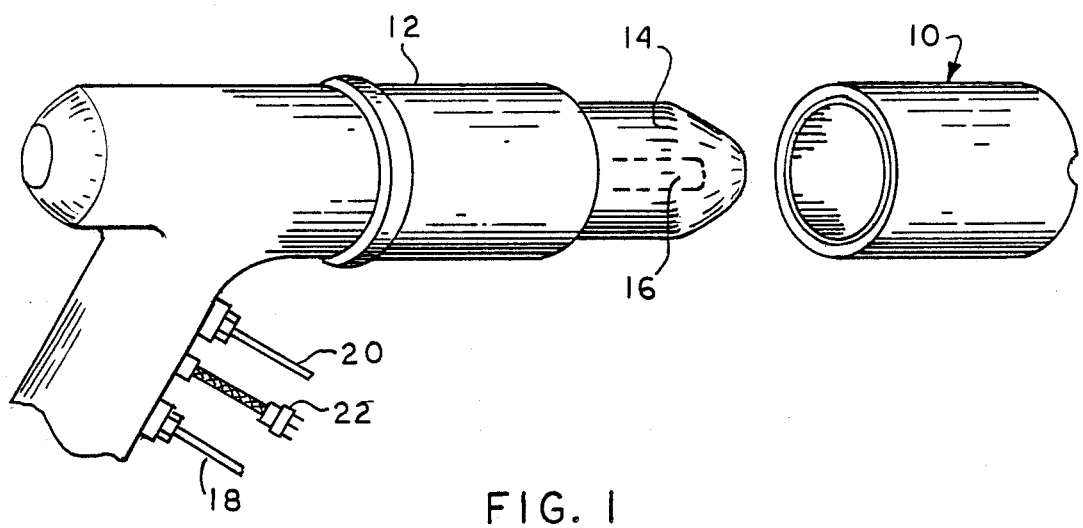
FIG. 1 is an exploded, elevational view of the shield cup protector apparatus of the present invention and a plasma arc torch.

Referring first to the exploded view of FIG. 1, there is illustrated the shield cup protector apparatus of the present invention, referred to generally by reference numeral 10, positioned proximate to a plasma arc torch body a ceramic shield cup 14 positioned at an end portion thereof. Ceramic shield cup 14 surrounds electrode 16 (shown in dotted lines). Also illustrated in FIG. 1 are gas inlets 18 and 20, respectively, and electrical supply line 22 to supply ionizable gas and electrical power to the torch 12.

As mentioned previously, because of the brittleness of the ceramic shield cup 14, the shield cup 14 is susceptible to breakage if the shield cup strikes a workpiece during operation of the torch 12. It is, accordingly, the purpose of the shield cup protector 10 of the present invention to prevent such breakage during operation of plasma arc torch 12. The shield cup protector 10 prevents such breakage by providing a continuous inner protection surface for the shield cup 14 which avoids localized breakage forces against the shield cup caused by impact of the torch with workpiece.

Figure 2:
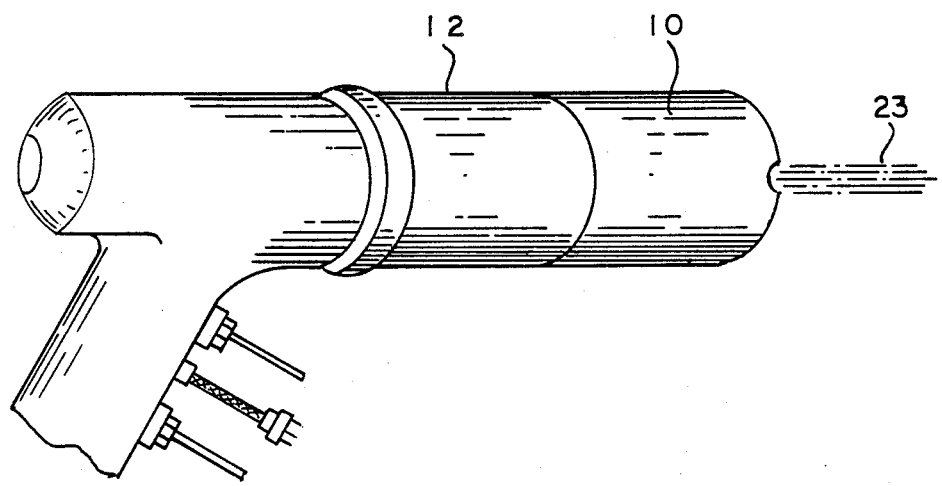
FIG. 2 is a side-elevational view similar to that of FIG. 1 with the shield cup protector apparatus of the present invention seated about a peripheral portion of the ceramic shield cup of a plasma arc torch to allow operation thereof.

Referring now to the side, elevational view of FIG. 2, shield cup protector 10 is dimensioned to be slidable over and closely surround shield cup 14 and to be supported thereby while allowing plasma arc 23 generated by torch 12 to extend beyond the end portion of shield cup protector 10 to allow welding and/or cutting operations to be performed with the torch 12.

Figure 3:
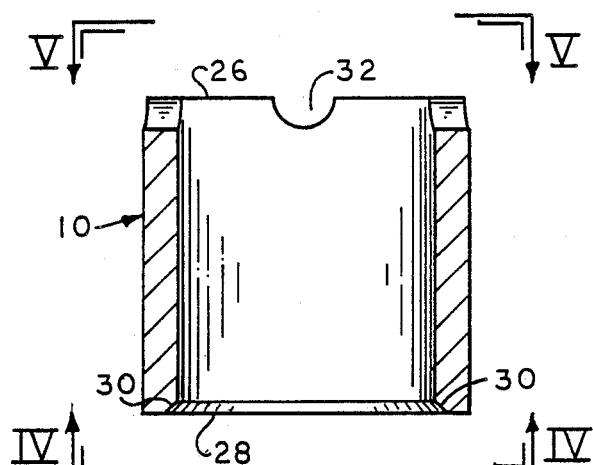
FIG. 3 is a longitudinal, cross-sectional view of the shield cup protector apparatus of the present invention.
Figure 4:
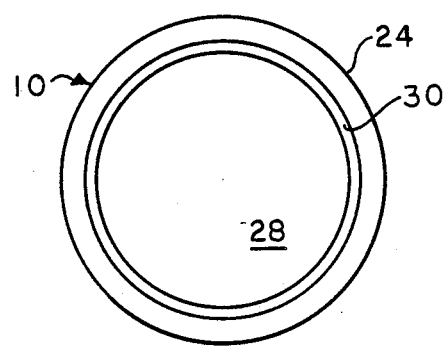
FIG. 4 is a bottom or end view of the shield cup protector apparatus taken along lines IV—IV of FIG. 3.

Turning now to FIG. 3, there is shown a longitudinal cross-section of the shield cup protector 10 of the present invention. Shield cup protector 10 is comprised of an elongated cylinder body 24 having opposing open ends 26 and 28. Preferably, the inner circumferential portion of end 28 is chamfered, indicated by reference number 30, to conform to, and to seat firmly about the outer periphery of ceramic shield cup 14 and against the arc torch body 12. As illustrated in the end or bottom view of FIG. 4, second end 28 of the elongated cylinder 24 is of dimensions to allow the protector apparatus 10 to seat firmly against the ceramic shield cup 14 of the plasma arc torch 12. The end view of FIG. 4 also illustrates chamfered are 30.

Figure 5:
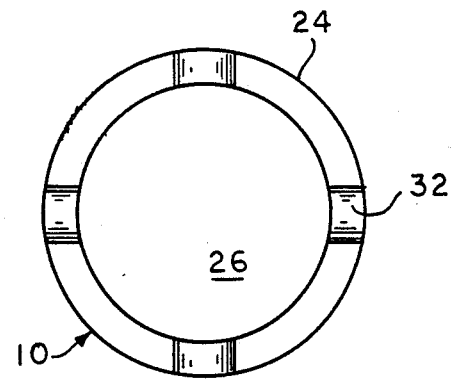
FIG. 5 is a end or top view taken along lines V—V of FIG. 3.

Elongated cylinder 24 is of a predetermined length, with the length preferably chosen such that a desired stand-off distance between the torch 12 and a workpiece is maintained when end 26 of the apparatus 10 is positioned against the workpiece. It is important, however, that length of the cylinder is chosen to protect the shield cup 14 against inadvertent impact. Also positioned at end 26 of the elongated cylinder 24 are vent notches or slots 32, preferably semicircular 32 to allow the egress of gas and other slag exhausted during operation of the plasma arc torch 12. Vents 32 are further illustrated in the end or top view of FIG. 5.

Preferably, the shield cup protector apparatus 10 is comprised of a heat resistant material, such as glass cloth silicone resin compound, or other such suitable material which is more resistant to fracture or breakage then conventional ceramics.

In operation, plasma arc torch 12 is positioned proximate to a workpiece, and end 26 of apparatus 10 is positioned to abut the workpiece. During cutting operations, an operator directs end 26 of apparatus 10 to slide across the workpiece, thereby performing the metalworking operation, while maintaining a proper stand-off distance, and providing mechanical protection of the shield cup 14.

When it is necessary to perform maintenance or repair operations on the plasma arc torch 12, such as, for example, when replacement of electrode 16 is required, the shield cup protector apparatus 10 and the shield cup 14 may be removed in unison in order to provide access to the individual torch parts. Alternatively, the protector apparatus 10, or the ceramic shield cup 14, may be disassembled separately if either part is required to be replaced.

While the present invention has been described in connection with the preferred embodiment of FIGS. 1-5, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

We claim:

1. A shield cup protector apparatus for protecting a plasma arc torch body end portion consisting of a shield cup formed of brittle ceramic material, said shield cup protector apparatus comprising an elongated cylinder having first and second open ends, said first open end of the elongated cylinder being dimensioned to be slidable over and seat firmly about a peripheral portion of the shield cup with the shield cup being insertable into an inner cylindrical cavity formed by said cylinder, said inner cylindrical cavity of said cylinder is a smooth cylindrical surface forming a uniform load transfer surface by which the cylinder is supported on and engaged along the entirety of a mating outer cylindrical surface of said shield cup, said mating outer cylindrical surface thereby providing a continuous support surface for said cylinder with said smooth cylindrical surface and said mating out cylindrical surface co-acting to prevent localized breakage forces against said shield cup, the elongated cylinder being of sufficient length to extend beyond the shield cup to protect the shield cup during at least one of welding and cutting operations to be performed with the plasma arch torch.

2. The shield cup protector apparatus of claim 1 wherein an inner circumferential portion of the first open end of the elongated cylinder is chamfered to allow firm seating against the plasma arc torch body and about the shield cup.

3. The shield cup protector apparatus of claim 1 wherein said elongated cylinder is of a length to allow a proper stand-off distance for torch operation when the second open end of the elongated cylinder is positioned to abut against a workpiece.

4. The shield cup protector apparatus of claim 1 wherein said elongated cylinder is comprised of glass cloth silicone resin compound.

* * * * *